(12) United States Patent
Love et al.

(10) Patent No.: US 9,487,073 B2
(45) Date of Patent: Nov. 8, 2016

(54) POWER TRAIN FOR CONTINUOUSLY VARIABLE POWER TRANSMISSION

(71) Applicant: DEERE & COMPANY, Moline, IL (US)

(72) Inventors: Galen R. Love, Cherryvale, KS (US); Briton T. Eastman, Coffeyville, KS (US); Alfred S. Smemo, Dubuque, IA (US); Craig A. Puetz, Waterloo, IA (US); Craig R. Eike, Coffeyville, KS (US)

(73) Assignee: Deere & Company, Moline, IL (US)

( * ) Notice: Subject to any disclaimer, the term of this patent is extended or adjusted under 35 U.S.C. 154(b) by 217 days.

(21) Appl. No.: 14/255,722

(22) Filed: Apr. 17, 2014

(65) Prior Publication Data

US 2015/0300471 A1    Oct. 22, 2015

(51) Int. Cl.
| | |
|---|---|
| B60K 6/00 | (2006.01) |
| F01B 21/00 | (2006.01) |
| F16K 47/08 | (2006.01) |
| F16H 47/08 | (2006.01) |
| B60K 6/445 | (2007.10) |
| F16H 3/72 | (2006.01) |
| F16H 37/08 | (2006.01) |
| B60K 6/12 | (2006.01) |

(52) U.S. Cl.
CPC ............ B60K 6/00 (2013.01); B60K 6/445 (2013.01); F01B 21/00 (2013.01); F16H 3/727 (2013.01); F16H 47/08 (2013.01); B60K 6/12 (2013.01); *F16H 2037/0886* (2013.01); *Y02T 10/6208* (2013.01); *Y02T 10/6239* (2013.01); *Y02T 10/6282* (2013.01)

(58) Field of Classification Search
None
See application file for complete search history.

(56) References Cited

U.S. PATENT DOCUMENTS

| | | |
|---|---|---|
| 6,962,545 B2 | 11/2005 | Larkin |
| 7,169,074 B2 | 1/2007 | Raghavan et al. |
| 7,192,373 B2 | 3/2007 | Bucknor et al. |
| 7,220,201 B2 | 5/2007 | Raghavan et al. |
| 7,235,029 B2 | 6/2007 | Klemen et al. |

(Continued)

FOREIGN PATENT DOCUMENTS

DE    102011115002 A1    4/2013

OTHER PUBLICATIONS

Toyota Electric Vehicle Technologies, SEAI Electric Vehicles Conference, http://www.seai.ie/News_Events/Previous_SEAI_events/Electric_Vehicles_Conference/Brendan_Sears_-_Toyota_.pdf, Admitted Prior Art.

(Continued)

*Primary Examiner* — Colby M Hansen
(74) *Attorney, Agent, or Firm* — Lorenz & Kopf, LLP

(57) ABSTRACT

A power train and related vehicle are described for continuously variable transmission of power. A gear set includes first and second input components and an output component. An engine provides mechanical power to the first input component and, when a clutch device is in a first state, to a first continuously variable power source ("CVP"). With the clutch device in a second state, the first CVP is decoupled from the engine. A second CVP receives non-mechanical power from the first CVP, and converts the non-mechanical power to mechanical power. When a brake device is not engaged, the second CVP provides the resulting mechanical power to the second input component. When the brake device is engaged, the brake device prevents the second input component from rotating.

17 Claims, 3 Drawing Sheets

(56) References Cited

U.S. PATENT DOCUMENTS

| | | |
|---|---|---|
| 7,238,131 B2 | 7/2007 | Raghavan et al. |
| 7,252,612 B2 | 8/2007 | Bucknor et al. |
| 7,252,613 B2 | 8/2007 | Bucknor et al. |
| 7,288,041 B2 | 10/2007 | Bucknor et al. |
| 7,371,203 B2 | 5/2008 | Raghavan et al. |
| 7,473,199 B2 | 1/2009 | Bucknor et al. |
| 7,506,711 B2 | 3/2009 | Usoro |
| 7,717,817 B2 | 5/2010 | Raghavan et al. |
| 7,867,124 B2 | 1/2011 | Conlon et al. |
| 8,337,352 B2 * | 12/2012 | Morrow ............... B60K 6/365 475/302 |
| 2003/0094317 A1 * | 5/2003 | Takizawa ............. B60K 6/365 180/53.8 |
| 2010/0298081 A1 | 11/2010 | Ivanysynova et al. |

OTHER PUBLICATIONS

M. Raghavan et al., Next Generation Propulsion System Architectures, NaCoMM-2007-121, Dec. 12-13, 2007, http://nacomm07.ammindia.org/Contents/papers/NaCoMM-2007-121.pdf.

John M. Miller, Comparative Assessment of Hybrid Vehicle Power Split Transmissions, Jan. 21, 2005, http://groups.engin.umd.umich.edu/vi/w4_workshops/Miller_W04.pdf.

John M. Miller, Hybrid Propulsion Systems: The Gasoline-Electric Strong Hybrid, Jun. 16, 2005, http://groups.engin.umd.umich.edu/vi/s4_workshops/VI_S05_miller.pdf.

German Patent and Trademark Office, German Search Report in Application No. 10 2015 206 949.4 dated Jul. 20, 2015.

* cited by examiner

POWER TRAIN FOR CONTINUOUSLY VARIABLE POWER TRANSMISSION

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to continuously variable transmissions, including transmissions for the operation of work vehicles for agricultural, forestry, construction, and other applications.

BACKGROUND OF THE DISCLOSURE

It may be useful, in a variety of settings, to utilize both a traditional engine (e.g., an internal combustion engine) and one or more infinitely variable power sources (e.g., an electric motor/generator or hydraulic motor/pump, a variable chain drive, and so on) to provide useful power. For example, a portion of engine power may be diverted to drive a first continuously variable power source ("CVP") (e.g., a first electric motor/generator acting as a generator, a first hydrostatic or hydrodynamic motor/pump acting as a pump, and so on), which may in turn drive a second CVP (e.g., a second electric motor/generator acting as a motor using electrical power from the first electric motor/generator, a second hydrostatic or hydrodynamic motor/pump acting as a motor using the hydraulic power from the first hydrostatic or hydrodynamic motor/pump, and so on).

In certain applications, power from both types of power sources (i.e., an engine and a CVP) may be combined for delivery of useful power (e.g., to drive a vehicle axle) via an infinitely variable transmission ("IVT") or continuously variable transmission ("CVT"). This may be referred to as "split-mode" or "split-path mode" because power transmission to a vehicle (or other) power sink may be split between a mechanical path from the engine and an infinitely/continuously variable path through one or more CVPs. In other applications, in contrast, useful power may be provided to power sinks from the engine (e.g., via various mechanical transmission elements, such as shafts and gears), but not from a CVP. This may be referred to as "mechanical-path mode." It will be understood that various non-mechanical power transmission devices, such as torque converters, may sometimes be used in the mechanical-path mode. In this light, a mechanical-path mode may be viewed simply as a power transmission mode in which the engine, but not the CVPs, provides useful power to a particular power sink.

SUMMARY OF THE DISCLOSURE

A power train and a vehicle for providing continuously (or infinitely) variable gear ratios are disclosed. According to one aspect of the disclosure, a power train for a vehicle with an engine includes a gear set with a first input component, a second input component, and an output component, wherein the engine provides mechanical power to the output component via the first input component. A first CVP is configured to receive mechanical power from the engine via a clutch device and convert the received mechanical power to non-mechanical power. A second CVP is configured to receive the non-mechanical power from the first CVP, convert the received non-mechanical power to mechanical power, and provide mechanical power to the output component of the gear set via the second input component of the gear set. A brake device is in communication with the second CVP and the second input component of the gear set.

When the brake device is in an engaged state, the brake device prevents the second input component of the gear set from rotating. When the clutch device is in a first state, the first CVP is decoupled from the engine. When the clutch device is in a second clutch state and the brake device is not engaged, mechanical power is provided to the first CVP from the engine and mechanical power is provided to the output component from the second CVP via the second input component.

One or more of the following features may also be included in the disclosed power train. The engine may provide mechanical power to the first input component via a first shaft. The first CVP may be configured to receive mechanical power from the engine via the first shaft, a first gear attached to the first shaft, a second gear meshed with the first gear, and a second shaft attached to the second gear. The second CVP may be configured to provide mechanical power to the second input component of the gear set via a third shaft, the brake device being configured to prevent rotation of one or more of the third shaft and the second input component. The power train may further include a multi-gear transmission receiving mechanical power from the output component of the gear set.

The gear set may include a planetary gear set. The first input component may include a ring gear of the planetary gear set. The second input component may include a sun gear of the planetary gear set. The output component may include a planet carrier gear of the planetary gear set.

According to another aspect of the disclosure, a vehicle with an engine includes a gear set with a first input component, a second input component, and an output component, wherein the engine provides mechanical power to the output component via the first input component. A first CVP is configured to receive mechanical power from the engine based upon, at least in part, a state of a first control device, and convert the received mechanical power to non-mechanical power. A second CVP is configured to receive the non-mechanical power from the first CVP, convert the received non-mechanical power to mechanical power, and provide mechanical power to the output component of the gear set via the second input component of the gear set. A second control device is in communication with the second CVP and the second input component of the gear set.

When the second control device is in a first state, the second control device prevents the second input component of the gear set from receiving power from the second CVP. When the first control device is in a second state, the first CVP is decoupled from the engine. When the first control device is in a third state and the first control device is not in the first state, mechanical power is provided to the first CVP from the engine and mechanical power is provided to the output component from the second CVP via the second input component.

One or more of the following features may also be included in the disclosed vehicle. The engine may provide mechanical power to the first input component via a first shaft. The first CVP may be configured to receive mechanical power from the engine via the first shaft, a first gear attached to the first shaft, a second gear meshed with the first gear, and a second shaft attached to the second gear. The second CVP may be configured to provide mechanical power to the second input component of the gear set via a third shaft, the second control device being configured to controllably prevent rotation of one or more of the third shaft and the second input component. The vehicle may further include a multi-gear transmission receiving mechanical power from the output component of the gear set.

The gear set may include a planetary gear set. The first input component may include a ring gear of the planetary gear set. The second input component may include a sun gear of the planetary gear set. The output component may include a planet carrier gear of the planetary gear set.

According to yet another aspect of the disclosure, a power train for a vehicle with an engine includes a planetary gear set with a ring gear, a planet carrier, and a sun gear, the planet carrier receiving mechanical power from the engine via the ring gear and a first shaft connecting the engine to the ring gear. A first CVP is configured to receive rotational mechanical power from the engine via the first shaft, a first gear attached to the first shaft, a second gear meshed with the first gear, a second shaft attached to the second gear, and a clutch device attached to the second shaft, and convert the received rotational mechanical power to non-mechanical power. A second CVP is configured to receive non-mechanical power from the first CVP, convert the received non-mechanical power to rotational mechanical power, and provide the converted rotational mechanical power to the sun gear via a third shaft. A brake device is in communication with the third shaft or the sun gear.

When the brake device is in an engaged state, the brake device prevents the third shaft and the sun gear from rotating. When the clutch device is in a first clutch state, the first CVP is decoupled from the engine with respect to rotational mechanical power transmitted from the engine to the first shaft. When the clutch device is in a second clutch state and the brake device is not engaged, rotational mechanical power is delivered from the engine to the first CVP and rotational mechanical power is provided from the second CVP to the planet carrier via the sun gear.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
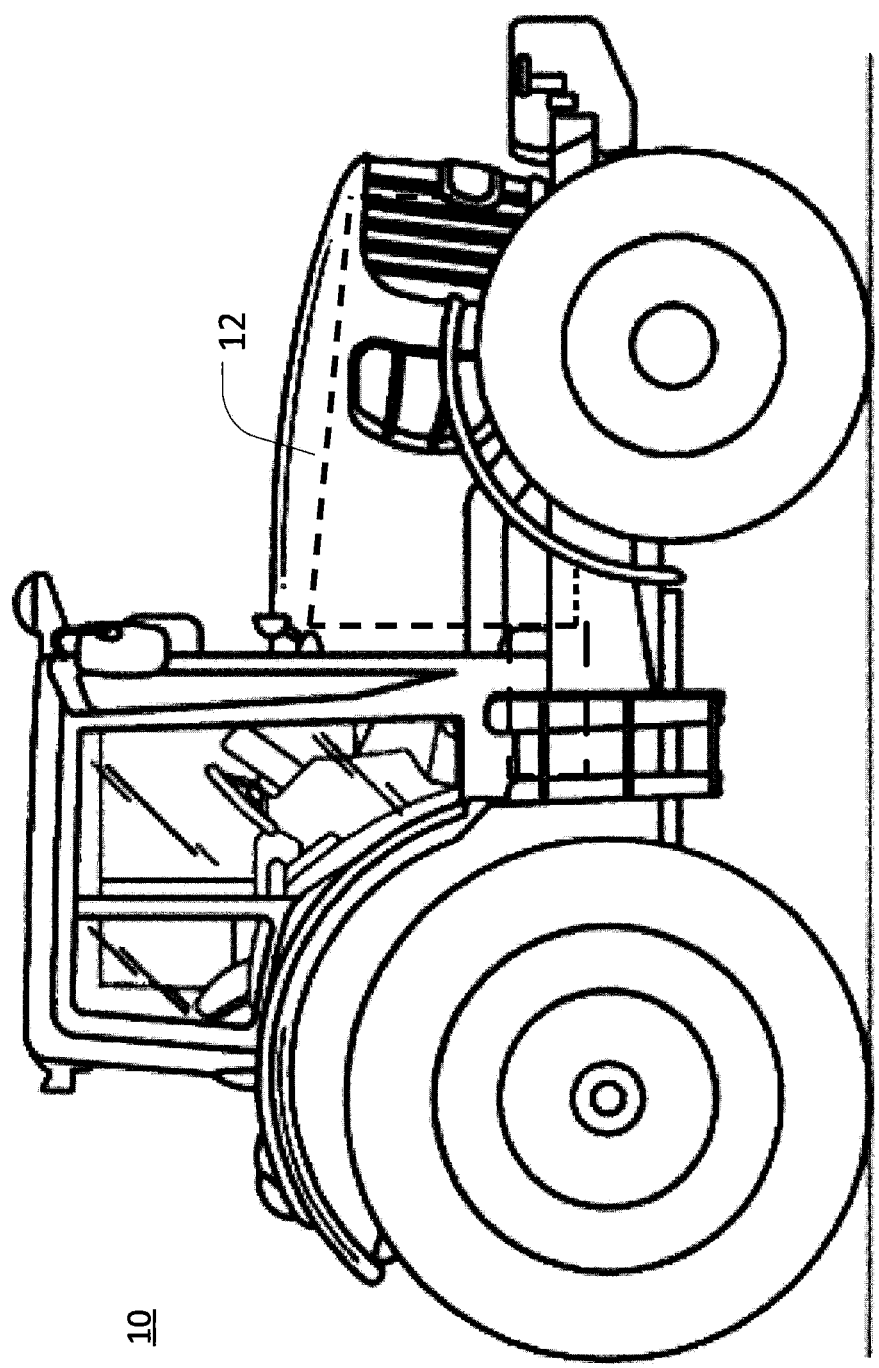
FIG. 1 is a side view of an example vehicle that may include a continuously variable transmission according to the present disclosure.

The following describes one or more example embodiments of the disclosed power train (or vehicle), as shown in the accompanying figures of the drawings described briefly above. Various modifications to the example embodiments may be contemplated by one of skill in the art.

For convenience of notation, "component" may be used herein, particularly in the context of a planetary gear set, to indicate an element for transmission of power, such as a sun gear, a ring gear, or a planet carrier. Further, references to a CVT (or continuously variable power train or power source) will be understood to also encompass, in various embodiments, configurations including an IVT (or infinitely variable power train or power source), and vice versa.

In the discussion below, various example configurations of shafts, gears, and other power transmission elements are described. It will be understood that various alternative configurations may be possible, within the spirit of this disclosure. For example, various configurations may utilize multiple shafts in place of a single shaft (or a single shaft in place of multiple shafts), may interpose one or more idler gears between various shafts or gears for the transmission of rotational power, and so on.

In the use of continuously (or infinitely) variable power trains, the relative efficiency of power transmission in various modes may be of some concern. It will be understood, for example, that mechanical transmission of power only from an engine to a gear set (i.e., in a mechanical-path transmission mode) may be a highly efficient mode of power transmission, whereas transmission of power through a CVP (i.e., in a split-path transmission mode) may be less efficient. This may result, for example, from the energy losses inherent to converting mechanical power from the engine into electrical or hydraulic power using a first CVP, transmitting the converted power to a second CVP, and then converting the transmitted power back to mechanical power. Accordingly, in certain circumstances it may be desirable to utilize mechanical-path transmission mode more heavily than the split-path mode (e.g., or a purely CVP-powered mode, with the engine, for example, providing useful power only to drive one or more CVPs). However, in other circumstances, the flexibility and other advantages provided by use of CVPs (e.g., in a split-path mode) may outweigh the inherent energy losses.

Among other advantages, the power train disclosed herein may usefully facilitate transition between split-path and mechanical-path modes for a vehicle or other powered platform. For example, through selective use of clutches and/or brakes, the disclosed power train may allow a vehicle to be driven either in split-path mode (i.e., as powered by both an engine and one or more CVPs) or in mechanical-path mode (i.e., as powered only by an engine), depending on the needs of a particular operation.

For example, in certain configurations of the contemplated power train, an engine may provide power via various mechanical (or other) power transmission elements (e.g., various shafts and gears, and so on) to both a first input component of a summing gear set and an input interface (e.g., a splined connection for a rotating shaft) of a first CVP. A control device (e.g., a clutch, brake, or other device capable of controllably allowing or preventing the transmission of mechanical power between two or more components) may be provided between the engine and the first CVP. In a first state (e.g., an engaged state of a clutch), the control device may permit mechanical power to be transmitted from the engine to the first CVP, and in a second state (e.g., a disengaged state of a clutch), the control device may prevent mechanical power from being transmitted from the engine to the first CVP.

A second CVP may receive non-mechanical (e.g., electrical or hydraulic) power from the first CVP. The second CVP may be configured to provide mechanical power, as controlled by a second control device (e.g., a brake), to a second input component of the summing gear set. In a first state (e.g., a disengaged state of a brake), the second control device may permit mechanical power to be transmitted from an output interface of the second CVP (e.g., a splined connection for a rotating shaft) to the second input component of the summing gear set, and in a second state (e.g., an engaged state of a brake), the second control device may not permit mechanical power to be transmitted from the output interface of the second CVP to the second input component. In certain embodiments, when the second control device is engaged, it may stop the rotation of a shaft connecting the second CVP to the second input component, the second input component itself, or both. In this way, through selective activation of the two (or more) control devices, various operational modes of the power train may be effected.

In various configurations, one or more planetary gear sets (or various other known gear set configurations) may be utilized to combine the power output of the second CVP and the engine. For example, a first component of a planetary gear set (e.g., a ring gear) may receive power from the engine, a second component of the planetary gear set (e.g., a sun gear) may receive power from the second CVP, and a third component of the planetary gear set (e.g., a planet carrier) may provide the summed power from the engine and the CVP at an output interface (e.g., an output shaft) of the gear set. A clutch device (e.g., a wet or dry clutch of various configurations) may control transmission of mechanical power between the engine and the first CVP, with mechanical power being transmitted between the engine and the first CVP when the clutch device is engaged. A brake device (e.g., a device capable of stopping a shaft from rotating) may control transmission of mechanical power between the second CVP and the sun gear of the planetary gear set, with both a shaft connecting the second CVP and the sun gear and the sun gear itself being stopped from rotating when the brake device is engaged. Such a configuration may allow for an essentially infinite (and continuously variable) number of gear ratios for the planetary gear set. For example, for a fixed engine speed, a particular effective gear ratio (or output speed, torque and so on) may be set by varying the speed of the second CVP with respect to the engine speed. Further, through selective control of the clutch and brake devices, the power train may be easily transitioned between split-path and mechanical modes.

As will become apparent from the discussion herein, the disclosed power train may be used advantageously in a variety of settings and with a variety of machinery. For example, referring now to FIG. 1, the disclosed power train (e.g., configured as power train 12) may be included in vehicle 10. In FIG. 1, vehicle 10 is depicted as a tractor with power train 12. It will be understood, however, that other configurations may be possible, including configurations with vehicle 10 as a different kind of tractor, a harvester, a log skidder, a grader, or one of various other work vehicle types. It will further be understood that the disclosed power train may also be used in non-work vehicles and non-vehicle applications (e.g., fixed-location power installations).

Figure 2:
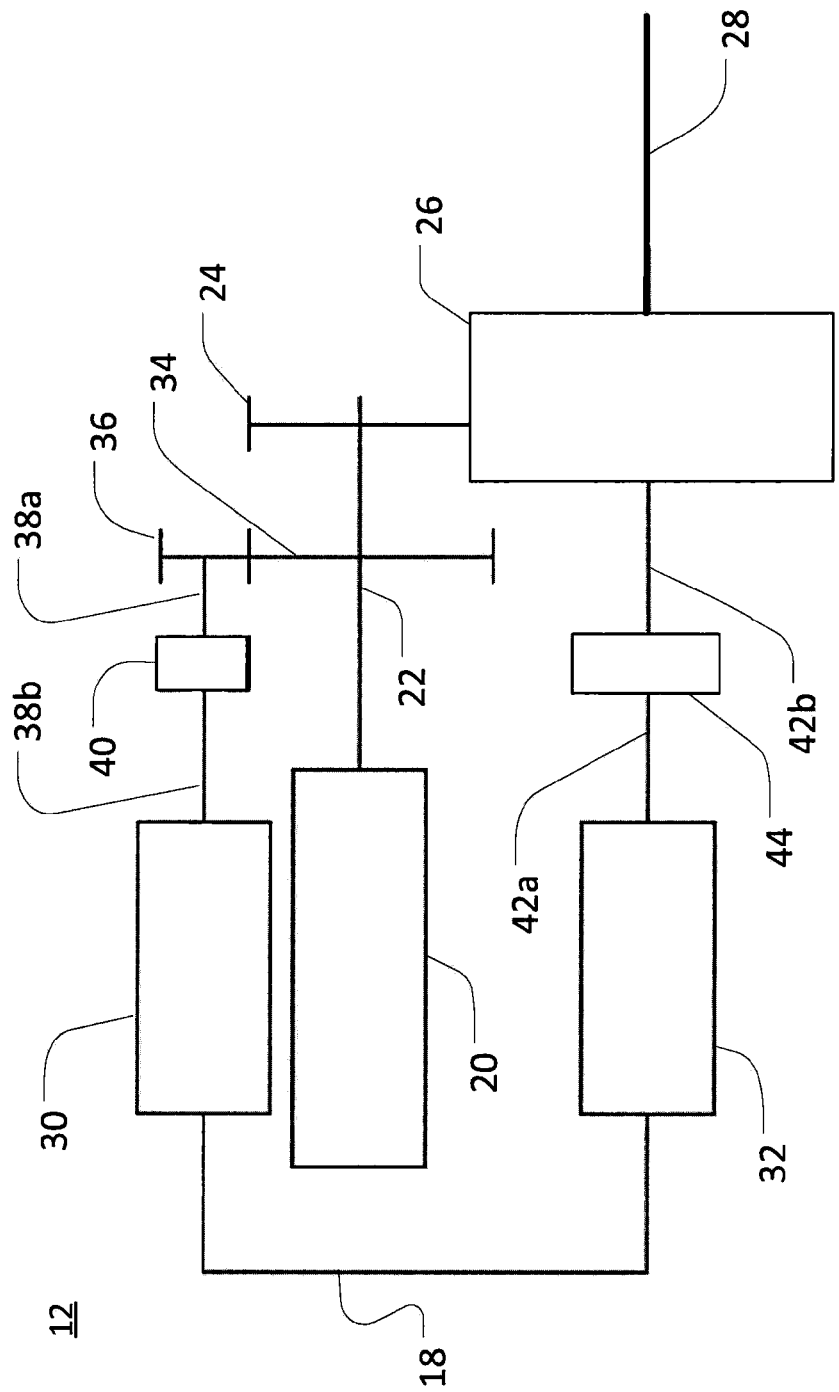
FIG. 2 is a schematic view of an example power train of the example vehicle of FIG. 1.

Referring now to FIG. 2, an example configuration of power train 12 is depicted. For example, power train 12 may include engine 20, which may be an internal combustion engine of various known configurations. Engine 20 may provide rotational mechanical power to output shaft 22, for transmission to various power sinks (e.g., wheels, power take-off ("PTO") shafts, and so on) of vehicle 10 (not shown in FIG. 2). In certain embodiments, a torque converter or other device may be included between engine 20 and shaft 22 (or another shaft (not shown)), although such a device is not necessary for the operation of power train 12, as contemplated by this disclosure. Further, in certain embodiments, multiple shafts (not shown) or equivalent power transmission devices (e.g., chains, belts, and so on) may be used in place of shaft 22 (or various other shafts discussed herein), including various shafts interconnected by various gears or other power transmission devices.

Shaft 22 may be configured to provide mechanical power to gear 24, or another power transmission component (not shown), for transmission of power from engine 20 to gear set 26. For example, gear 24 may be directly mounted by a splined connection to shaft 22. Gear set 26, as discussed in greater detail below, may be a summing gear set such as a planetary gear set, and may include an output component (e.g., a splined connection (not shown)) coupled to shaft 28. Accordingly, mechanical power may be transmitted via a purely mechanical (or other) path from engine 20 to shaft 28, via shaft 22, gear 24 and gear set 26. Shaft 28, in turn, may transmit mechanical power to a power sink of vehicle 10, such as various vehicle wheels (e.g., via one or more differentials (not shown) or transmissions (not shown in FIG. 2)), various PTO shafts, and so on.

Power train 12 may also include CVPs 30 and 32. Each of CVPs 30 and 32, for example, may be an electrical motor/generator or a hydraulic motor/pump, with electrical or hydraulic power, respectively, being transmitted between CVPs 30 and 32 via appropriate conduits (e.g., electrical conduits 18). For convenience, the discussion below may consider CVPs 30 and 32 to be electrical machines (i.e., electrical motors/generators). It will be understood, however, that the disclosed power train is not limited to this configuration.

In certain embodiments, various power storage devices (not shown) may also be included in power train 12. For example, with CVPs 30 and 32 configured as electrical motors/generators a battery (or other storage device) may be in electrical (or other) communication with both CVPs 30 and 32 for the storage (and delivery) of electrical power.

In certain embodiments, CVP 30 may receive mechanical power (e.g., to be used for generating electrical power) from engine 20. For example, gear 34 may be configured to receive mechanical power from shaft 22 (e.g., via a splined connection (not shown)), gear 36 may be configured to receive mechanical power from gear 34 (e.g., via a meshing between gears 34 and 36, via one or more interposed idler gears (not shown), and so on) and transmit mechanical power to shaft 38 (e.g., via a splined connection (not shown)). In certain embodiments, shaft 38 may be divided between shaft portions 38a and 38b. Shaft 38 (e.g., at shaft portion 38b) may be configured to provide the mechanical power received from gear 36 to CVP 30 (e.g., via another splined connection (not shown)).

In certain embodiments, control device 40 (e.g., a clutch or other similar device) may be utilized to control the flow of mechanical power between gear 36 and CVP 30. For example, referring also to FIG. 3, control device 40 may be configured as clutch device 40a (e.g., a wet clutch, dry clutch, dog collar clutch, or other device configured to replicate the known functionality of a clutch) interposed between shaft portions 38a and 38b. Clutch device 40a may accordingly be utilized to selectively control whether mechanical power is transmitted from gear 36 to CVP 30. For example, in a first clutch state of clutch device 40a (e.g., a fully engaged or locked state), shaft portion 38b may be appropriately coupled to shaft portion 38a for transmission of power from gear 36 to CVP 30. Accordingly, rotational mechanical power may be transmitted from engine 20 to CVP 30, via shaft 22, gears 34 and 36, clutch 40a and shaft portions 38a and 38b. This mechanical power may then be converted to electrical (or other) power by CVP 30 and, for example, transmitted to CVP 32. Conversely, in a second clutch state of clutch device 40*a* (e.g., a disengaged or unlocked state), shaft portion 38*b* may not be coupled to shaft portion 38*a* and power may not be transmitted from gear 36 to CVP 30.

Control device 40 (e.g., configured as clutch device 40*a*) may be controlled by various actuators of known configuration (not shown). These actuators, in turn, may be controlled by a transmission control unit ("TCU") (not shown), which may receive various inputs from various sensors or devices (not shown) via a controller area network ("CAN") bus (not shown) of vehicle 10. In certain embodiments, control device 40 may, for example, be controlled in accordance with programmed or hard-wired shift control logic contained in or executed by a TCU.

As also noted generally above, it will be understood that other configurations for transmission of power from engine 20 to CVP 30 may also be possible. For example, control device 40 (including when configured as clutch device 40*a*) may be located elsewhere in power train 12, or may be coupled to various other components of power train 12, while still controlling the transmission of power between engine 20 and CVP 30.

In certain embodiments, still referring to FIG. 2, CVP 32 may be configured to provide mechanical power to gear set 26. For example, CVP 32 may receive non-mechanical (e.g., electrical) power from CVP 30 (e.g., as described above) and may convert the received power to rotational mechanical power at shaft 42 (e.g., as divided between shaft portions 42*a* and 42*b*). Shaft 42 (e.g., at shaft portion 42*b*) may be coupled to an input component of gear set 26 (e.g., via a splined or other connection (not shown)), such that mechanical power provided from CVP 32 may be transmitted via gear set 26 to shaft 28. In this way, for example, with gear set 26 configured as a summing gear set, mechanical power from either (or both) of engine 20 and CVP 32 may be received at gear set 26 and provided to shaft 28.

In certain embodiments, an additional control device (e.g., control device 44) may be utilized to control transmission of power from CVP 32 by gear set 26. For example, as also noted above, it may be useful to provide for a mechanical-path mode in which engine 20, but not CVP 32, is used to provide power to shaft 28. Control device 44 may facilitate such a mechanical-path mode by, for example, preventing the transmission of power from CVP 32 by gear set 26. For example, referring again to FIG. 3, control device 44 may be configured as brake device 44*a* (i.e., a device capable of stopping the rotation of one or more power train components), which may be mounted to a fixed body with respect to shaft 42 in order to controllably stop the rotation of shaft 42 (and, in certain configurations, rotation of the associated input component of gear set 26). In this way, for example, when brake device 44*a* is activated, shaft 42 may be stopped and no mechanical power may be transmitted from CVP 32 to gear set 26 (even though electrical power may be flowing to CVP 32).

Control device 44 (e.g., configured as brake device 44*a*) may be controlled by various actuators of known configuration (not shown). These actuators, in turn, may be controlled by a transmission control unit ("TCU") (not shown), which may receive various inputs from various sensors or devices (not shown) via a CAN bus (not shown) of vehicle 10. In certain embodiments, control device 44 may, for example, be controlled in accordance with programmed or hard-wired shift control logic contained in or executed by a TCU.

CVP 32 (and CVP 30) may also be controlled by various known means. For example, a TCU or other controller may control the output speed (or other characteristics) of CVP 32 based upon various inputs from various sensors or other controllers, various programmed or hard-wired control strategies, and so on. Transmission of non-mechanical power between CVPs 30 and 32 (and various intermediary devices, such as batteries or other energy storage devices) may also be similarly controlled.

Figure 3:
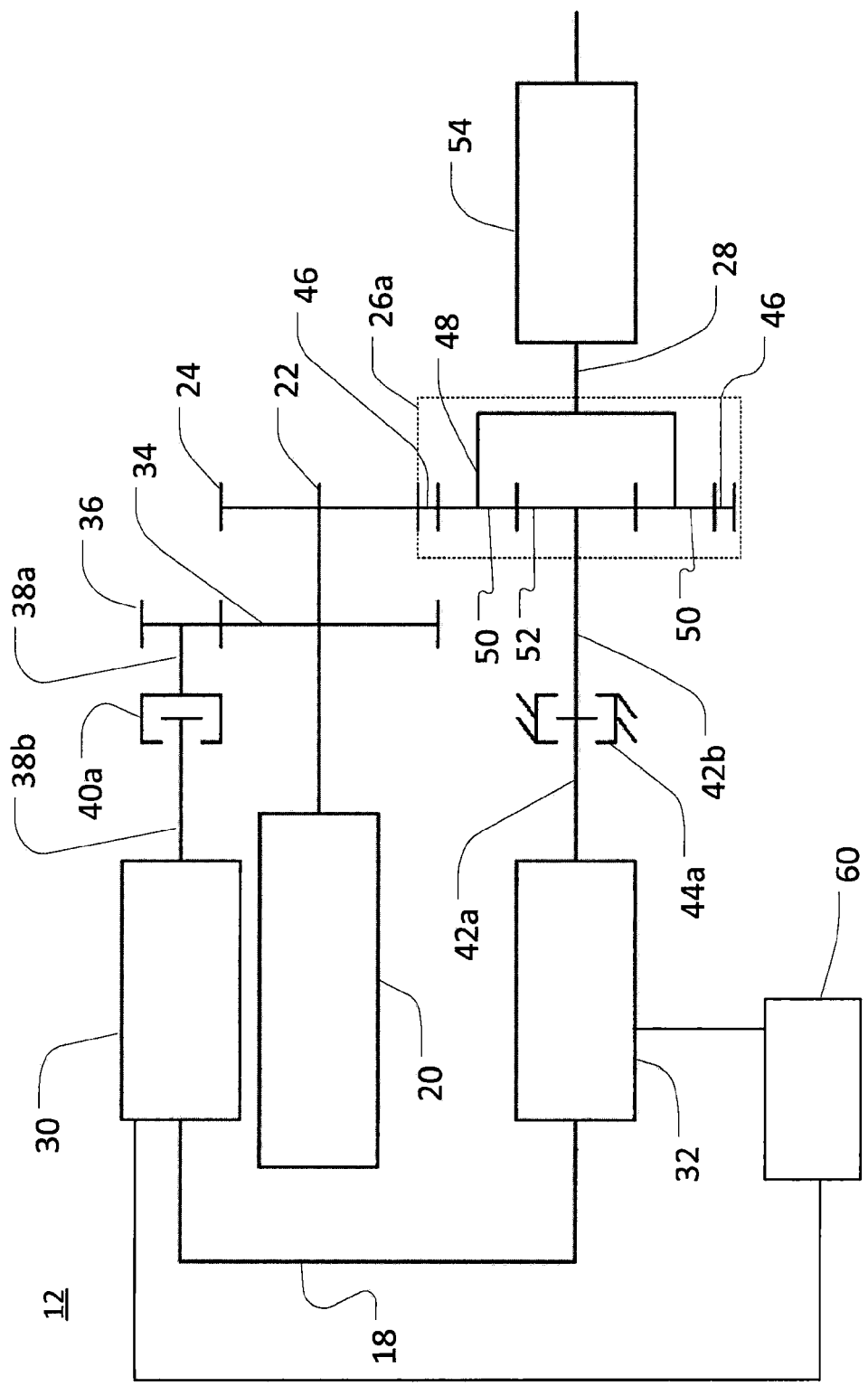
FIG. 3 is a schematic view of an example configuration of the example power train of FIG. 2.

In certain embodiments, still referring to FIG. 3, gear set 26 may be configured as planetary gear set 26*a*, with two components of planetary gear set 26*a* acting as input components and one component of planetary gear set 26*a* acting as an output component. For example, ring gear 46 may act as a first input component, receiving mechanical power from engine 20 via gear 24. Power may then flow from engine 20, via ring gear 46 and planet gears 50, to planet carrier 48 (i.e., the output component of planetary gear set 26*a*, as depicted in FIG. 3) and shaft 28. Likewise, sun gear 52 may act as a second input component, with mechanical power flowing from CVP 32, via shaft 42, sun gear 52 and planet gears 50, to planet carrier 48 and shaft 28. In this way, for example, planetary gear set 26*a* may be configured to sum mechanical power received, respectively, from engine 20 and CVP 32, thereby potentially providing a continuously variable power and speed output at shaft 28.

In the configuration depicted in FIG. 3 (and various alternative configurations), power train 12 may be utilized to controllably transition between mechanical-path and split-path modes, via the selective actuation of clutch device 40*a* (or another control device 40) and brake device 44*a* (or another control device 44). For example, with clutch device 40*a* fully engaged, mechanical power may be transmitted from engine 20 to gear set 26*a* (e.g., at ring gear 46 of planetary gear set 26*a*) as well as to CVP 30 (via gear 34, and so on). CVP 30 may accordingly function as a generator (e.g., an electrical generator) and may transmit the resulting non-mechanical (e.g., electrical) power to CVP 32 (e.g., via conduit 18). CVP 32 may convert the received non-mechanical power to mechanical power, which may be transmitted to shaft portion 42*a*. With brake device 44*a* disengaged (i.e., with brake device 44*a* not preventing rotation of shaft portions 42*a* or 42*b*), mechanical power may accordingly be transmitted from CVP 32 to an input component of gear set 26*a* (e.g., sun gear 52 of planetary gear set 26*a*). Through control of the rotational speed of shaft portion 42*a* (e.g., through control of the rotational speed of CVP 32), the speed of the associated input component of gear set 26*a* (e.g., sun gear 52 of planetary gear set 26*a*) may then be varied. Accordingly, through the combination of rotational mechanical power from engine 20 (which may, for example, be provided at a relatively fixed speed, determined based upon an optimal operating state of engine 20) and rotational mechanical power from CVP 32 (which may, for example, be controllably varied across a wide range of speeds), gear set 26*a* may provide a continuously variable power output to shaft 28. In this way, the disclosed power train (e.g., power train 12) may allow for a continuously variable and controllable split-path transmission mode.

It will be understood that other operational modes may also be possible. For example, CVP 32 may receive stored power from an energy storage device (not shown) even if CVP 30 is not currently generating non-mechanical power (e.g., if clutch device 40*a* is not fully engaged).

The disclosed power train (e.g., power train 12) may also permit the use of a mechanical-path mode, through the selective control of devices 40 and 44 (e.g., of clutch device 40a and brake device 44a). For example, still referring to FIG. 3, clutch device 40a may be disengaged, thereby preventing the transmission of mechanical power from engine 20 to CVP 30. Further, brake device 44a may be engaged, thereby preventing the transmission of mechanical power from CVP 32 to planetary gear set 26a and, in certain configurations, also preventing the rotation of sun gear 52. Accordingly, the full mechanical power of engine 20 (or a full fraction thereof, if mechanical power from engine 20 is also diverted to other devices (not shown) via other output interfaces or shafts (not shown)) may be transmitted to planetary gear set 26a, via gear 24, and then to shaft 28, via ring gear 46, planet gears 50, and planet carrier 48.

In certain embodiments, brake device 44a (or another control device 44) may be similarly engaged to stop rotation of shaft 42 and sun gear 52 (or another input component of gear set 26a), while clutch device 40a (or another control device 40) may be engaged in order to permit transmission of mechanical power from engine 20 to CVP 30. In this way, for example, only mechanical power from engine 20 may be provided to shaft 28 (e.g., via ring gear 46, and so on) while non-mechanical power from CVP 30 may be provided to various other components associated with vehicle 10 (e.g., energy storage devices or electrical implements or devices not configured to draw power from shaft 28).

In certain embodiments, additional gear sets (e.g., a set of range gears) may be interposed between power train 12 and various power sinks of vehicle 10 (e.g., a differential or PTO shaft (not shown)). For example, a transmission of various configurations (e.g., multi-speed range transmission 54) may be provided downstream of gear set 26, for further adjustment of speed and torque to power various vehicle power sinks.

In certain embodiments, various additional (or alternative) control devices may be employed in order to regulate the flow of power among the various components described above. For example, in addition (or as an alternative) to the control of power flow from (or to) a CVP with a clutch or brake device (or other similar control devices), a controller may be utilized to directly regulate the power output, power conversion, or other functionality of a CVP. In this way, for example, not only may the actual mechanical, hydraulic, electrical or other output of a CVP be regulated, but a particular CVP may be engaged to effectively function as a brake device or similar mechanism with respect to other components of the power train 12.

Still referring to FIG. 3, for example, a control device in the form of controller 60 may be in communication with one or both of CVPs 30 and 32. Controller 60 may include, for example, a computing device, a hydraulic control device with various control valves, an electrical control device with various control circuits, a power electronics device including various power inverters, rectifiers, motor drives, or other components, or various other electrical control devices, or various other control devices. As appropriate, controller 60 may be utilized to control the power output of one or both of CVPs 30 and 32 (or various other CVP functionality), in order to assist in the overarching control of power transmission between engine 20 and transmission 54 (or other downstream components of power train 12). In certain embodiments, both controller 60 and brake device 44a (as well as various other control devices) may be included in power train 12. In certain embodiments, only one of controller 60 and brake device 44a may be provided.

In certain embodiments, as a replacement for (or supplement to) brake device 44a preventing sun gear 52 from receiving power from CVP 32, controller 60 may directly cause CVP 32 to cease providing power to shaft 42a (e.g., by preventing CVP 32 from converting power received from CVP 30 back to mechanical rotation, or by directing CVP 30 to cease providing converted power to CVP 32). In this way, for example, controller 60 may assist in preventing planetary gear set 26a from receiving power from CVP 32 and thereby allow power train 12 to operate in a mechanical-path mode. Alternatively, in certain instances, controller 60 may direct CVP 32 to actively provide a torque to shaft 42a that may resist other relevant torques in order to prevent rotation of sun gear 52. For example, when ring gear 46 is receiving rotational power from engine 20, ring gear 46 may, via planet gears 50, impose a torque on sun gear 52. In such a case, controller 60 may sometimes cause CVP 32 to apply a corresponding counter-torque to sun gear 52 in order to generally prevent sun gear 52 from rotating. Various other control strategies involving controller 60 and other control devices, may also be possible.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A power train for a vehicle including an engine, the power train comprising:
   a gear set with a first input component, a second input component, and an output component, wherein the engine provides mechanical power to the output component via the first input component;
   a first continuously variable power source configured to receive mechanical power from the engine via a clutch device and convert the received mechanical power to non-mechanical power;
   a second continuously variable power source configured to receive the non-mechanical power from the first continuously variable power source, convert the received non-mechanical power to mechanical power, and provide mechanical power to the output component of the gear set via an output interface of the second continuously variable power source and the second input component of the gear set; and
   a brake device in communication with one or more of the output interface of the second continuously variable power source and the second input component of the gear set;

wherein, when the brake device is in an engaged state the brake device prevents the second input component of the gear set from rotating;

wherein, when the clutch device is in a first clutch state, the first continuously variable power source is decoupled from the engine with respect to provision of mechanical power from the engine to the first continuously variable power source and the first continuously variable power source is decoupled from the gear set with respect to provision of mechanical power from the gear set to the first continuously variable power source; and wherein, when the clutch device is in a second clutch state and the brake device is not engaged, mechanical power is provided to the first continuously variable power source from the engine and mechanical power is provided to the output component from the second continuously variable power source via the second input component.

2. The power train of claim 1, wherein the engine provides mechanical power to the first input component via a first shaft; and wherein the first continuously variable power source is configured to receive mechanical power from the engine via the first shaft, a first gear attached to the first shaft, a second gear meshed with the first gear, and a second shaft attached to the second gear.

3. The power train of claim 1, wherein the second continuously variable power source is configured to provide mechanical power to the second input component of the gear set via a third shaft, the brake device being configured to prevent rotation of one or more of the third shaft and the second input component.

4. The power train of claim 1, wherein the gear set includes a planetary gear set.

5. The power train of claim 4, wherein the first input component includes a ring gear of the planetary gear set.

6. The power train of claim 4, wherein the second input component includes a sun gear of the planetary gear set.

7. The power train of claim 4, wherein the output component includes a planet carrier of the planetary gear set.

8. The power train of claim 1, further comprising:
a multi-gear transmission receiving mechanical power from the output component of the gear set.

9. A vehicle with an engine, the vehicle comprising:
a gear set with a first input component, a second input component, and an output component, wherein the engine provides mechanical power to the output component via the first input component;
a first continuously variable power source configured to receive mechanical power from the engine based upon, at least in part, a state of a first control device, and convert the received mechanical power to non-mechanical power;
a second continuously variable power source configured to receive the non-mechanical power from the first continuously variable power source, convert the received non-mechanical power to mechanical power, and provide mechanical power to the output component of the gear set via an output interface of the second continuously variable power source and the second input component of the gear set; and
a second control device in communication with one or more of the output interface of the second continuously variable power source and the second input component of the gear set;

wherein, when the second control device is in a first state the second control device prevents the second input component of the gear set from receiving power from the second continuously variable power source;

wherein, when the first control device is in a second state, the first continuously variable power source is decoupled from the engine with respect to provision of mechanical power from the engine to the first continuously variable power source and the first continuously variable power source is decoupled from the gear set with respect to provision of mechanical power from the gear set to the first continuously variable power source; and wherein, when the first control device is in a third state and the second control device is not in the first state, mechanical power is provided to the first continuously variable power source from the engine and mechanical power is provided to the output component from the second continuously variable power source via the second input component.

10. The vehicle of claim 9, wherein the engine provides mechanical power to the first input component via a first shaft;

wherein the first continuously variable power source is configured to receive mechanical power from the engine via the first shaft, a first gear attached to the first shaft, a second gear meshed with the first gear, and a second shaft attached to the second gear.

11. The vehicle of claim 9, wherein the second continuously variable power source is configured to provide mechanical power to the second input component of the gear set via a third shaft, the second control device being configured to controllably prevent rotation of one or more of the third shaft and the second input component.

12. The vehicle of claim 9, wherein the gear set includes a planetary gear set.

13. The vehicle of claim 12, wherein the first input component includes a ring gear of the planetary gear set.

14. The vehicle of claim 12, wherein the second input component includes a sun gear of the planetary gear set.

15. The vehicle of claim 12, wherein the output component includes a planet carrier of the planetary gear set.

16. The vehicle of claim 9, further comprising:
a multi-gear transmission receiving mechanical power from the output component of the gear set.

17. A power train for a vehicle including an engine, the power train comprising:
a planetary gear set with a ring gear, a planet carrier, and a sun gear, the planet carrier receiving mechanical power from the engine via the ring gear and a first shaft connecting the engine to the ring gear;
a first continuously variable power source configured to receive rotational mechanical power from the engine and convert the received rotational mechanical power to non-mechanical power, the first continuously variable power source configured to receive rotational mechanical power from the engine via the first shaft, a first gear attached to the first shaft, a second gear meshed with the first gear, a second shaft attached to the second gear, and a clutch device attached to the second shaft;
a second continuously variable power source configured to receive non-mechanical power from the first continuously variable power source, convert the received non-mechanical power to rotational mechanical power, and provide the converted rotational mechanical power to the sun gear via a third shaft; and a brake device in communication with one or more of the third shaft and the sun gear, wherein when the brake device is in an engaged state the brake device prevents the third shaft and the sun gear from rotating;

wherein, when the clutch device is in a first clutch state, the first continuously variable power source is decoupled from the engine with respect to rotational mechanical power transmitted from the engine to the first shaft; and wherein, when the clutch device is in a second clutch state and the brake device is not engaged, rotational mechanical power is delivered from the engine to the first continuously variable power source and rotational mechanical power is provided from the second continuously variable power source to the planet carrier via the sun gear.

\* \* \* \* \*